Figure 1:
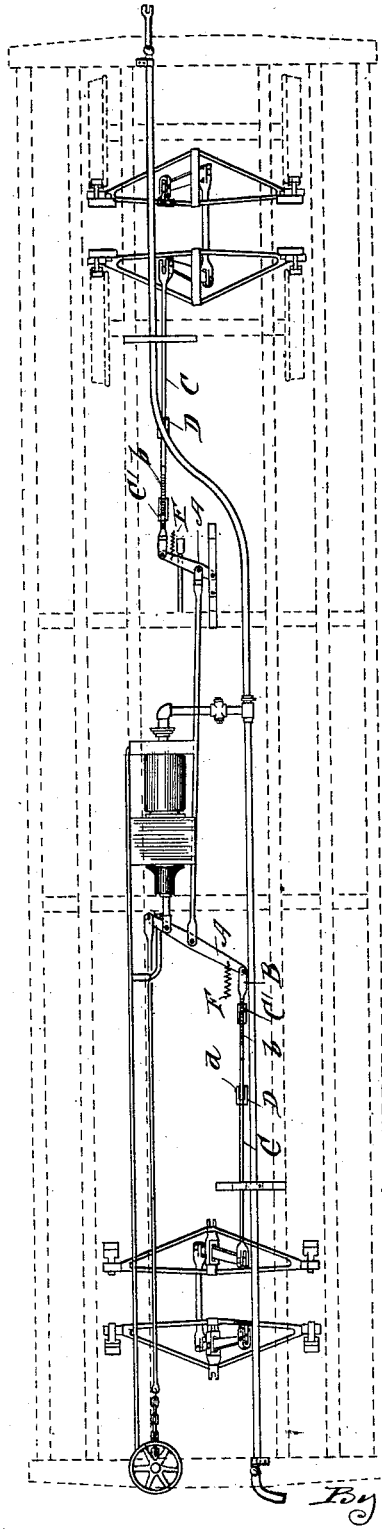

(No Model.) 2 Sheets—Sheet 1.

G. L. HARVEY.
SLACK ADJUSTER FOR CAR BRAKES.

No. 477,842. Patented June 28, 1892.

Witnesses,
D. Mann,
F. B. Goodwin

Inventor,
George L. Harvey
By Offield Towle & Linthicum
Attys.

(No Model.) 2 Sheets—Sheet 2.
G. L. HARVEY.
SLACK ADJUSTER FOR CAR BRAKES.
No. 477,842. Patented June 28, 1892.
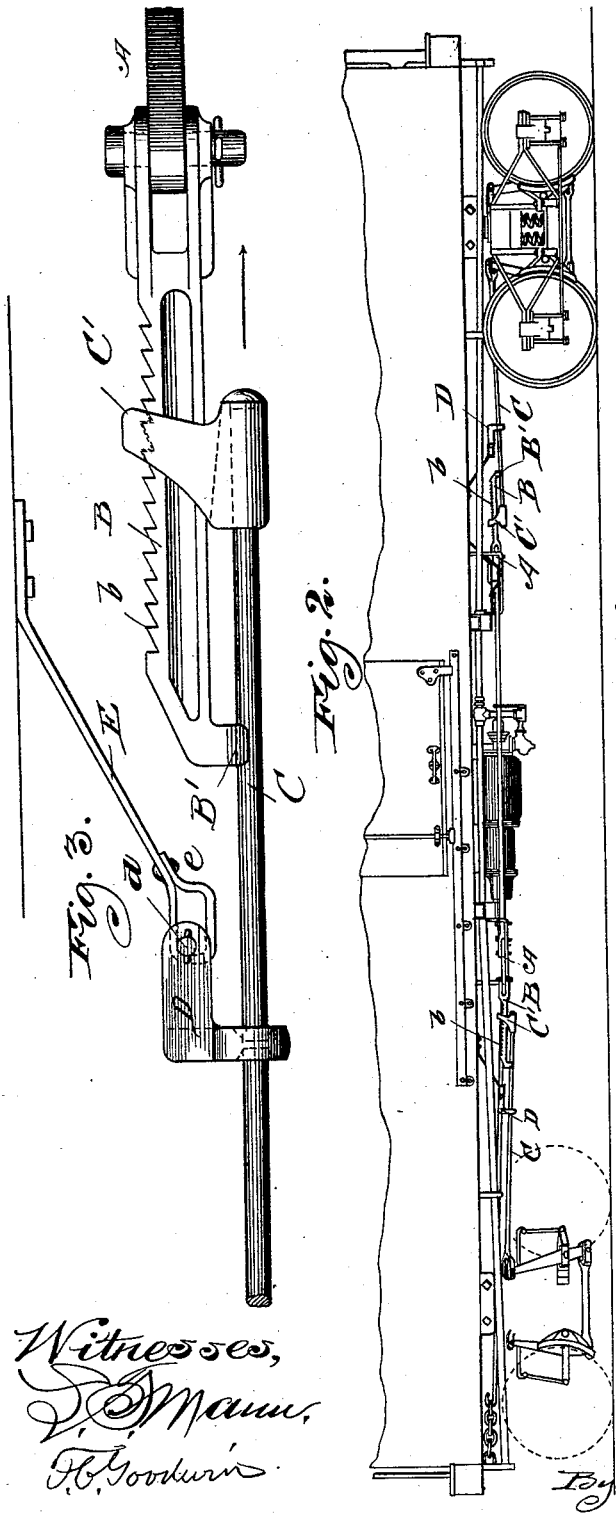
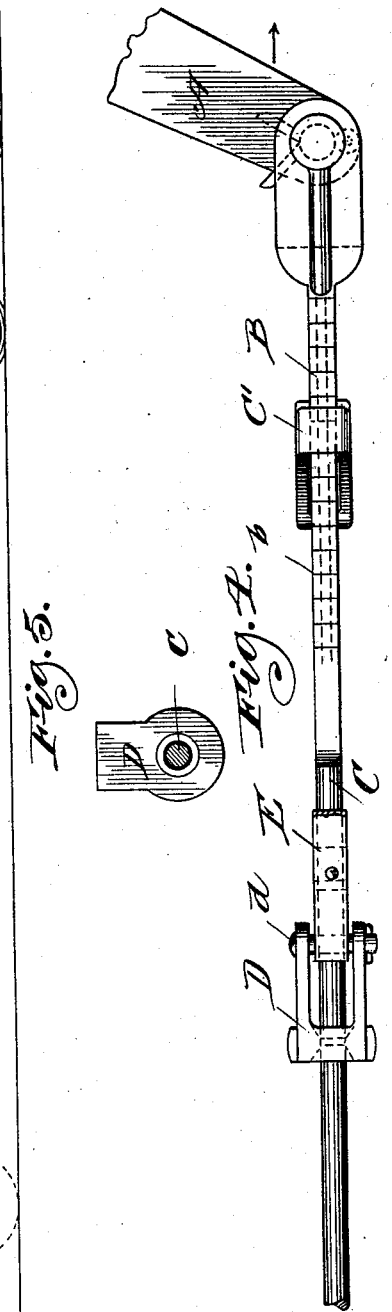
Witnesses,
Inventor,
George L. Harvey

UNITED STATES PATENT OFFICE.

GEORGE L. HARVEY, OF CHICAGO, ILLINOIS.

SLACK-ADJUSTER FOR CAR-BRAKES.

SPECIFICATION forming part of Letters Patent No. 477,842, dated June 28, 1892.

Application filed December 19, 1891. Serial No. 415,575. (No model.)

*To all whom it may concern:*

Be it known that I, GEORGE L. HARVEY, of Chicago, Illinois, have invented certain new and useful Improvements in Slack-Adjusters for Car-Brakes, of which the following is a specification.

This invention relates to that class of devices which are used for automatically taking up the wear of brake-shoes and other parts of the brake-gear of car-brakes; and the object of the invention is to attain simplicity and economy in construction, while providing an efficient adjuster which can be readily applied to all classes of cars and to various parts of the brake-gear.

In carrying out my invention I prefer to apply my slack-adjuster to one of the connecting-rods of the brake-gear immediately beneath the car-floor, and to do this I divide said rod and adapt the members thereof for adjustment with relation to each other and provide means for locking them in their adjusted positions. The locking means selected for illustration in the accompanying drawings is a ratchet-and-pawl mechanism. In order to hold one member of this divided rod against movement to permit the adjustment, I employ a clutch, preferably L-shaped in form and having an aperture in one leg thereof, through which one member of the divided connecting-rod slides freely in one direction, and the clutch is so hung that it will rock and grip the rod and prevent its return through the clutch. The clutch itself has a limited sliding movement with reference to its support sufficient only to permit the release of the brakes, and its movement is limited by suitable stops, preferably in the form of a slotted hanger, within the slot of which a pin carried by the clutch travels.

My invention consists in the devices and combinations of devices hereinafter described, and particularly pointed out in the claims.

In the drawings, Figure 1 is an inverted plan view of the bottom of a car equipped with an air-brake and showing my invention applied to the connecting-rod of the brake-gear for each truck. Fig. 2 is a side elevation of the same parts and showing the body of the car broken away. Fig. 3 is an enlarged side elevation of the adjuster and connected parts partly broken away. Fig. 4 is a plan view of the same; and Fig. 5 is an end view of the clutch, the rod showing in section.

In the drawings, A represents one of the floating levers of the brake-gear, and B C the members of a divided connecting-rod between said floating lever A and the truck-lever. The member B is provided with rack-teeth $b$, and it may have the foot B', bearing on the member C. Said member is provided with the longitudinally-slotted pawl C', the side walls of the slot forming suitable guides for the rack member in order to keep the parts in alignment. To provide for the riding of this pawl up over the teeth in taking up the slack, the pivotal connection of the member B with the floating lever may be made loose by elongating the aperture in the upper jaw of said member; but the normal tendency of said member B is to rise in taking up the slack, the foot B' resting loosely on the member C.

D represents a clutch. (Best shown in the side elevation, Fig. 3.) This clutch is conveniently made L-shaped, its lower leg having an aperture corresponding in cross-sectional form to that of the rod C, which is intended to slide freely through it in one direction and to be locked therewith in the movement in the opposite direction. The upper leg of this clutch has a slot-and-pin connection with a hanger E, the upper end of which is made fast to the body of the car. The loop forming said slot is marked $e$, and the pin $d$ is carried by the clutch. Of course the arrangement may be reversed.

The form of the clutch may be considerably varied so long as it is adapted to move forward with the rod during the application of the brake and permit the rod to slide through it in case there is undue slack in the gear while operating always to clutch the rod and prevent its return. A chain-and-ring clutch would serve the same purpose. Evidently the clutch must have a rocking movement in order to permit its aperture to assume an angular position with reference to the rod.

In operation a pull on the connecting-rod tending to move it in the direction indicated by the arrow of Fig. 3 will cause the members B, C, and D to move forward together a distance corresponding to the length of the slot in the hanger E, when if there is no appreciable slack the brakes will be applied. Upon the release of the brake the members will move back together, the pin being free to slide in the slot. If there be undue slack in the gear, the member B will be moved a greater distance than the length of the slot, sliding freely through the clutch, and then upon the release of the brake the parts will travel back locked together until the pin has reached the backward limit of its travel, whereupon the rod will be locked and its pawl held stationary, while the rack will slide through the pawl until the latter rides over and engages a new tooth, thus taking up the slack and automatically adjusting the parts to compensate therefor. The length of the slot in which the pin of the clutch travels will be such as to permit the release of the brakes.

In applying my invention to cars equipped with hand-brakes I employ the retracting-spring F, one end of which is connected with lever A and the other to a fixed point. This spring operates to bring the floating levers back to place after each actuation.

In applying my invention to cars already in service the member B' is provided by simply cutting off the forked end of the usual connecting-rod, slipping the dog C' upon said end and heading it over, as clearly shown in Fig. 3 of the drawings, and then the part C is applied, the ordinary pin serving to connect it.

While I prefer to apply this slack-adjuster to the connecting-rod between the floating-lever and the brake-lever, as described, it may be applied at other points in the brake-gear.

Without limiting my invention to precise details of construction, I claim—

1. In a slack-adjuster for car-brakes, the combination, with a divided tension-rod the members whereof are adjustable with relation to each other, and means for locking them in their adjusted position, of a sliding clutch carried by one of the members, and means independent of the brake-gear, whereby to limit the throw of the clutch, substantially as described.

2. In a slack-adjuster for car-brakes, the combination, with a divided tension-rod the members whereof are adapted to be adjusted with relation to each other, and means for locking them in their adjusted position, of a clutch carried by one of said members, and a variable connection between the clutch and a fixed part of the car, substantially as described.

GEORGE L. HARVEY.

Witnesses:
C. C. LINTHICUM,
FREDERICK C. GOODWIN.